Patented Aug. 4, 1936

2,049,882

UNITED STATES PATENT OFFICE 2,049,882

BUILDING TILE

George Witty, Long Island City, N. Y.

No Drawing. Application September 30, 1935,
Serial No. 42,975

1 Claim. (Cl. 106—24)

This invention relates to improvements in building tile formed from a compound and improvements in the process of manufacturing the same; and the object of my improvement is to produce a building tile which will be hard, fireproof, waterproof and non-conductor of heat, sound and electricity, and which costs less than the ordinary terra cotta tile.

A further important advantage of the invention is to provide a tile which can be sawed, bored, and which will take nails and screws without the liability of split and crack.

The tile are formed of a mixture comprising the following ingredients, combined in about the following proportions by weight stated, viz.:

| | Parts |
|---|---|
| High magnesia lime | 40 |
| Calcium sulfate | 10 |
| Ground blast furnace slag | 70 |
| Silica quartz | 24 |
| Pigments | 5 |
| Calcined sodium sulfate | 1 |

The ingredients are intimately mixed as in a concrete mixer or any other suitable apparatus, water being added in quantity to form fluid mass of such consistency as will permit it to be filled into molds. After being placed in the molds, the mixture is allowed to set, and after being thoroughly set the tile are removed from the molds and dried.

I do not restrict myself to the exact proportions therein specified, as the proportions may be varied to produce a tile of different qualities.

Having fully described my invention, what I claim as new and desire to secure by Letters Patent is:

A composition of matter adapted for use as a building tile, consisting of 40 parts of high magnesia lime, 10 parts calcium sulfate, 70 parts ground blast furnace slag, 24 parts silica quartz, 5 parts pigment, 1 parts calcined sodium sulfate.

GEORGE WITTY.